United States Patent [19]

Hasegawa et al.

[11] Patent Number: 5,285,234
[45] Date of Patent: Feb. 8, 1994

[54] PHASE DIFFERENCE DETECTING TYPE AUTOFOCUSING DEVICE INCLUDING AN OPTICAL SYSTEM HAVING FIRST AND SECOND LENSES

[75] Inventors: Jun Hasegawa; Takashi Miida, both of Ashigarakami, Japan

[73] Assignee: Fuji Photo Film Co., Ltd., Kanagawa, Japan

[21] Appl. No.: 904,327

[22] Filed: Jun. 25, 1992

[30] Foreign Application Priority Data

Jun. 26, 1991 [JP] Japan .................. 3-154678

[51] Int. Cl.$^5$ .............................. C03B 13/36
[52] U.S. Cl. ........................................ 354/408
[58] Field of Search ............. 354/402, 406, 407, 408

[56] References Cited

U.S. PATENT DOCUMENTS

| | | | |
|---|---|---|---|
| 4,640,613 | 2/1987 | Yokoyama et al. | 354/408 X |
| 5,113,215 | 5/1992 | Nishibe | 354/408 |
| 5,168,299 | 12/1992 | Taniguchi et al. | 354/407 |

Primary Examiner—W. B. Perkey
Attorney, Agent, or Firm—Sughrue, Mion, Zinn, Macpeak & Seas

[57] ABSTRACT

A phase difference detecting type autofocusing device capable of selectively focusing a desired one of a plurality of subjects within a field of view, by using a simple structure. The phase difference detecting type autofocusing device includes an optical system having first and second lenses, the first and second lenses having the same focal length and disposed on a first plane with the optical axes of the lenses being set in parallel. A plurality of first photosensors are disposed on a second plane in parallel with the first plane, for converting information of images focused by the first lens into electric signals; and a plurality of second photosensors are disposed on the second plane at positions covered by the second lens, for converting information of images focused by the second lent into electric signals. Each second photosensor is spaced apart in the same direction by the same distance from a corresponding one of the plurality of first photosensors.

5 Claims, 6 Drawing Sheets

PHASE DIFFERENCE DETECTING TYPE AUTOFOCUSING DEVICE INCLUDING AN OPTICAL SYSTEM HAVING FIRST AND SECOND LENSES

BACKGROUND OF THE INVENTION a) Field of the Invention

The present invention relates to an autofocusing device for use with cameras or the like, and more particularly to an autofocusing device of a phase difference detecting type, capable of selectively focusing a desired one of a plurality of subjects.

b) Description of the Related Art

A phase difference detecting type autofocusing method is known as one of a number of autofocusing methods.

According to this method, two images of the single subject are focused by two lenses, and a difference in position of the two focused images changing with the distance from the lenses to the subject, is detected in the form of a phase difference.

FIGS. 7A shows an example of a conventional phase difference detecting type autofocusing device. At the back of an equivalent film plane 52 after a taking lens 51, there are disposed a condenser lens 53, a separator lens 54 and a phase difference detector in this order.

The phase difference detector is constructed of line sensors 55 and 56 such as CCDs and a signal processor 57. The line sensors 55 and 56 photoelectrically convert a pair of images of a subject focussed by the separator lens 54. The signal processor 57 discriminates an in-focus state, based upon electric signals obtained from pixels of the line sensors 55 and 56, the electric signals corresponding to a light intensity distribution on the pixels.

A pair of images focussed on the line sensors 55 and 56 comes near an optical axis 58 if the subject image is of a front focus state before the equivalent film plane 52. Conversely, the pair of images goes away from the optical axis 58 if the subject image is of a rear focus state. At an in-focus state, the pair of images takes an intermediate position between front focus and rear focus.

A phase difference detecting method is used for detecting the positions of images focused on the line sensors 55 and 56. According to this method, an in-focus state is discriminated by a relative shift amount (phase difference) between focused images, the relative shift amount corresponding to a minimum correlation value between pairs of images on the line sensors 55 and 56. A correlation value is given by the following equation (1):

$$H(m) = \Sigma(k=1 \text{ to } n) |B(k) - R(k+m-1)| \quad (1)$$

where $\Sigma(k=1 \text{ to } n)$ is a sum of functions for $k=1$ to $k=n$. $k$ represents a k-th pixel of the line sensor 55 operating as a standard line sensor. $m$ is an integer from 1 to 9 and represents the relative shift amount.

$B(k)$ represents an electric signal time-sequentially outputted from respective pixels of the standard line sensor 55, and $R(k+m-1)$ represents an electric signal time-sequentially outputted from respective pixels of the reference line sensor 56. The equation (1) is calculated for $m=1$ to 9 to obtain a correlation value $H(1)$, $H(2)$, ..., $H(9)$.

It is preset that an in-focus state is obtained, for example, when the correlation value $H(5)$ takes a minimum value. If another correlation value takes a minimum value, this shift amount, i.e., a phase difference from $m=5$, is detected as an out-of-focus.

An example of the structure of the conventional signal processor 57 is shown in FIG. 7B. Electric signals $B(k)$ and $R(k)$ generated at respective pixels of the line sensors 55 and 56 are converted into digital data of 8 bits for example by a microcomputer 60, and temporarily stored in a random access memory (RAM) 61. Thereafter, a central processing unit (CPU) 60 calculates the equation (1) using the digital data stored in RAM 61.

In the autofocusing device shown in FIGS. 7A and 7B, electric charges stored in the photosensors are directly converted into, and detected as, a voltage signal which is then converted into a digital signal and stored in RAM 61, digital signals in RAM 61 being read out and calculated.

SUMMARY OF THE INVENTION

It is an object of the present invention to provide a phase difference detecting type autofocusing device capable of selectively focusing a desired one of a plurality of subjects within a field of view, by using a simple structure.

According to an aspect of the present invention, there is provided a phase difference detecting type autofocusing device comprising: an optical system having first and second lenses, the first and second lenses having the same focal length and disposed on a first plane with the optical axes of the lenses being set in parallel; a plurality of first photosensors disposed on a second plane in parallel with the first plane, for converting information of images focused by the first lens into electric signals; and a plurality of second photosensors disposed on the second plane at positions covered by the second lens, for converting information of images forcused by the second lens into electric signals, each second photosensor being spaced apart in the same direction by a same distance from a corresponding one of the plurality of first photosensors.

A first photosensor and second photosensor are disposed at areas corresponding to the first and second lenses, to thereby configure a phase difference detecting type autofocusing device. A plurality of first photosensors are disposed at areas covered by the first lens, and a plurality of second photosensors are disposed at areas covered by the second lens, thereby allowing to detect focus states of a plurality of areas within a field of view. Although the number of photosensors increases, the number of lenses is fixed, thus providing a simple structure of the optical system.

Furthermore, a plurality of photosensors can be fabricated on a single semiconductor substrate, posing no substantial problem of an extended space for photosensors, and the like. Each pair of photosensors is positioned at areas equivalent relative to the lenses.

As a result, even if photosensors are positioned spaced apart from the optical axes of the lenses, there is substantially no adverse lens effects.

It is therefore possible to detect focus states of a plurality of areas within a field of view, without complicating the structure of the optical system.

DESCRIPTION OF THE PREFERRED EMBODIMENTS

An autofocusing device proposed by the present assignee in the past will be first described in order to help understand the present invention.

Figure 8A:
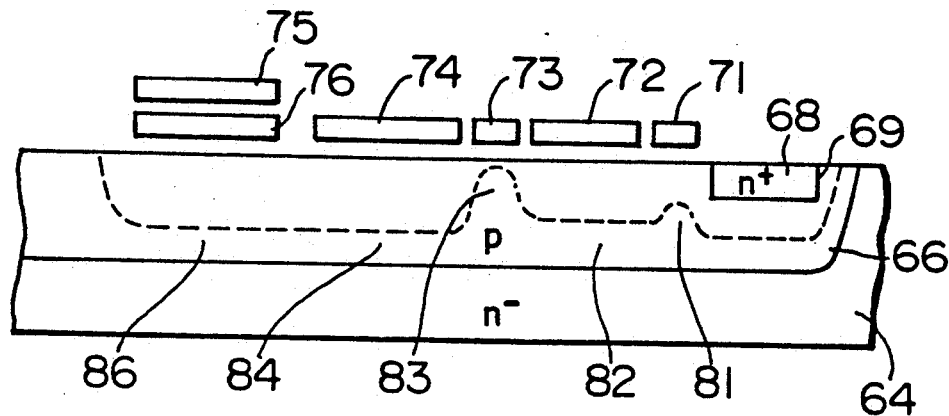
FIG. 8A is a schematic cross sectional view showing the structure of a conventional photosensor.

The present assignee proposed an autofocusing device which non-destructively reads electric charges stored upon application of light and processes them directly in the form of analog quantity. FIG. 8A shows an example of the structure of a photosensor of such an autofocusing device.

The photosensor is structured by forming a p-type well 66 on the surface of an n−-type silicon substrate 64 and forming an n+-type region 68 within the p-type well 66 to obtain a p-n junction 69 as a photodiode. When light is applied near to the p-n junction 69, pairs of electrons and holes are formed.

Electrons and holes are separated and stored in accordance with the potential gradient near the p-n junction 69. The p-type well 66 extends to the left of the p-n junction 69 as viewed in FIG. 8A. Formed on the surface of the substrate 64 are polysilicon gate electrodes 71 to 74 and a floating gate electrode 76, respectively insulated from the p-type well 66. Formed next to the photodiode is a potential barrier 81 under the gate electrode 71. Formed next to the potential barrier 81 is a store region 82 under the gate electrode 72.

Electric charges corresponding in amount to incident light to the photodiode and generated near at the p-n junction 69, go across the potential barrier 81 to be stored in the store region 82. The store region 82 is contiguous, across a potential barrier 83 under the transfer gate 73, to a shift resister region 84 under the gate electrode 74. The shift register region 84 is contiguous to a read region 86 under the floating gate 76 on which a bias applying aluminum electrode 75 is formed.

When pairs of electrons and holes are generated in response to incident light to the photodiode, carriers go across the potential barrier 81 to be stored in the store region 82 under the gate electrode 72, and across the potential barrier 83 under the transfer gate 73 to be transferred in the shift register region 84 under the gate electrode 74.

Electric charges stored in the shift register region 84 are transferred to the read region 86 under the floating gate electrode 76, in response a voltage applied to the gate electrode 75. Electric charges are induced in the floating gate 76, the amount of electric charges being dependent upon the electric charges transferred to the read region 86. In accordance with the quantity of electric charges in the floating gate 76, the incident light quantity is non-destructively read. After this read operation, carriers are again returned back to the shift register region 84 and shifted therein.

In the above manner, electric charges in the shift register region 84 are sequentially and non-destructively read.

For the photosensor such as shown in FIG. 8A, a switched capacitor integrator can be used to calculate the equation (1) by using the signal from the photosensor detected directly in the form of analog quantity.

Figure 8B:
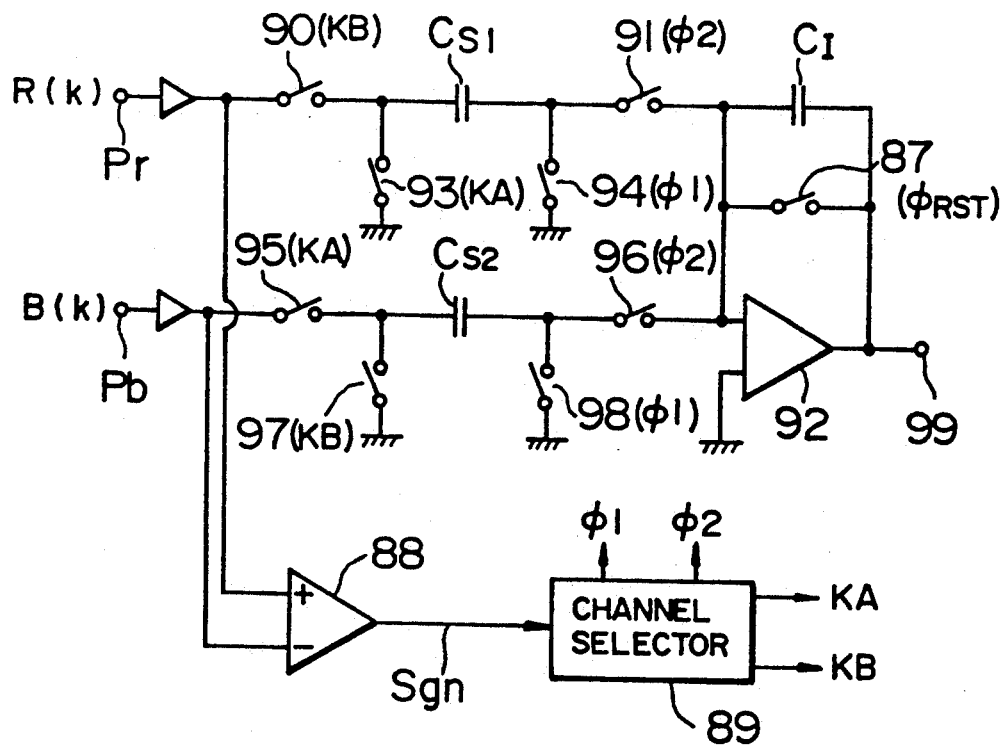
FIG. 8B is a circuit diagram schematically showing a switched capacitor integrator.

FIG. 8B shows an example of a switched capacitor integrator.

Referring to FIG. 8B, an electric charge signal B(k) from a standard photosensor and an electric charge signal R(k) from a reference photosensor are applied to input terminals Pb and Pr of the switched capacitor integrator, respectively, and supplied via amplifiers to inverting and non-inverting input terminals of a differential amplifier 88.

The differential amplifier 88 generates a sign signal Sgn, this signal changing depending upon the relation of amplitude between the input signals B(k) and R(k). The sign signal Sgn is then supplied to a channel selector 89. The channel selector 89 generates pairs of select signals $\phi 1$ and $\phi 2$, and KA and KB, the polarities of the selects signals being reversed in accordance with the sign signal Sgn.

The input terminal Pr is connected via the amplifier and switch 90 to a capacitor $C_{S1}$, the switch 90 being controlled by the select signal KB. Both the electrodes of the capacitor $C_{S1}$ are connected to switches 93 and 94 so that they can be grounded under control of the select signals KA and $\phi 1$. The electrode of the capacitor $C_{S1}$ on the switch 94 side is connected to an inverting input terminal of an operational amplifier 92 via a switch 91 which is controlled by the select signal $\phi 2$.

Similarly, the input terminal Pb is connected via the amplifier and switch 95 to a capacitor $C_{S2}$, the switch 95 being controlled by the select signal KA. Both the electrodes of the capacitor $C_{S2}$ are connected to switches 97 and 98 so that they can be grounded under control of the select signals KB and 1. The electrode of the capacitor $C_{S2}$ on the switch 98 side is connected to a non-inverting input terminal of the operational amplifier 92 via a switch 96 which is controlled by the select signal $\phi 2$. The non-inverting input terminal of the operational amplifier 92 is connected to ground.

An output terminal 99 of the operational amplifier 92 is connected back to the non-inverting terminal via a parallel connection of a capacitor CI and switch 99 which is controlled by a select signal $\phi_{RST}$. Neither the select signals KA and KB nor the select signals $\phi 1$ and $\phi 2$ will not take a high level at the same time.

For example, when the select signals KB and $\phi 1$ take the high level, the switches 90 and 94, and 97 and 98 close. The signal R(k) charges the capacitor $C_{S1}$, and the other capacitor $C_{S2}$ is grounded at both the electrodes and therefore discharged.

When the select signals KA and $\phi 2$ become high at the next timing, the switches 91 and 93, and 95 and 98 close. The capacitor $C_{S1}$, having been grounded at its right electrode as viewed in FIG. 8B, is now grounded at its left electrode, and the right electrode is connected to the inverting input terminal of the operational amplifier 92. Therefore, the effective potential of R(k) is inverted at this time. The capacitor $C_{S2}$ is connected, via the switches 95 and 96, between the input terminal Pb and the inverting input terminal of the operational amplifier 92.

As a result, the signal B(k) is charged in the capacitor $C_{S2}$. In this manner, a voltage difference between signals R(k) and B(k) is inputted to the inverting input terminal of the operational amplifier 92.

When the relation of amplitude between the signals R(k) and B(k) is reversed, the channel selector 89 reverses the phases of the select signals KA and KB, and $\phi 1$ and $\phi 2$ in accordance with the sign signal Sgn. In this case, the signal B(k) is first charged into the capacitor CS2, and the signal B(k) is inverted in its sign and applied to the inverting input terminal of the operational amplifier 92. The signal R(k) is applied via the capacitor CS1 to the inverting input terminal of the operational amplifier 92.

A signal corresponding to the absolute value of a voltage difference between signals B(k) and R(k) is therefore applied to the inverting input terminal of the operational amplifier 92. In this manner, values of the above-described function H are calculated. It is therefore possible to obtain a phase difference and detect an in-focus state.

If one of a plurality of subjects within a fixed field of view, e.g., subjects at the center and opposite sides, is to be focused, basically three autofocusing devices are required. Consider an active type autofocusing device which applies light from a light source such as an LED built in a camera to detect a reflected light. In order to detect the focuses of a plurality of subjects, current is required to be supplied to a plurality of LEDs, resulting in a large current consumption. In addition, use of a plurality of LEDs increases the number of components.

In the case of a passive type autofocusing device which detects a focus by not using light emitted from a camera but using light from a subject itself, the problem of increased current consumption can be eliminated. In a proposed autofocusing device of this type, of three pairs of line sensors one pair is positioned laterally at the central area of a focal plane, and the two pairs are positioned vertically at opposite sides thereof. Each pair of line sensors is provided with a pair of lenses, totaling three pairs of lenses.

Figure 1:
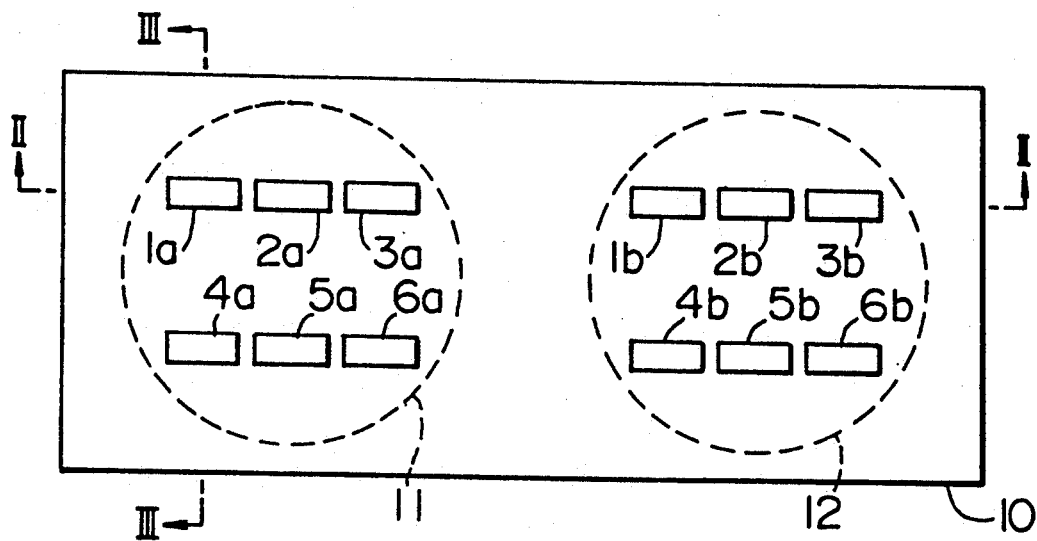
FIG. 1 is a plan view showing the outline of an embodiment of an autofocusing device according to the present invention.

FIG. 1 shows an embodiment of an autofocusing device according to the present invention. A pair of lenses 11 and 12 are disposed with their optical axes being set in parallel, forming the same imaging plane. Mounted on this imaging plane is a semiconductor chip 10 having photosensors 1a, 2a, 3a, 4a, 5a and 6a within an area covered by the lens 11, and photosensors 1b, 2b, 3b, 4b, 5b and 6b within an area covered by the lens 12.

The photosensors 1a and 1b constitute a photosensor pair. Similarly, the photosensors 2a and 2b, 3a and 3b, 4a and 4b, 5a and 5b, and 6a and 6b each constitute a photosensor pair. Each photosensor pair is spaced apart in the horizontal direction by a distance equal to that between the pair of lenses 11 and 12. Therefore, the effects of lens aberration are substantially equal for each sensor pair, e.g., sensors 1a and 1b.

Figure 2:
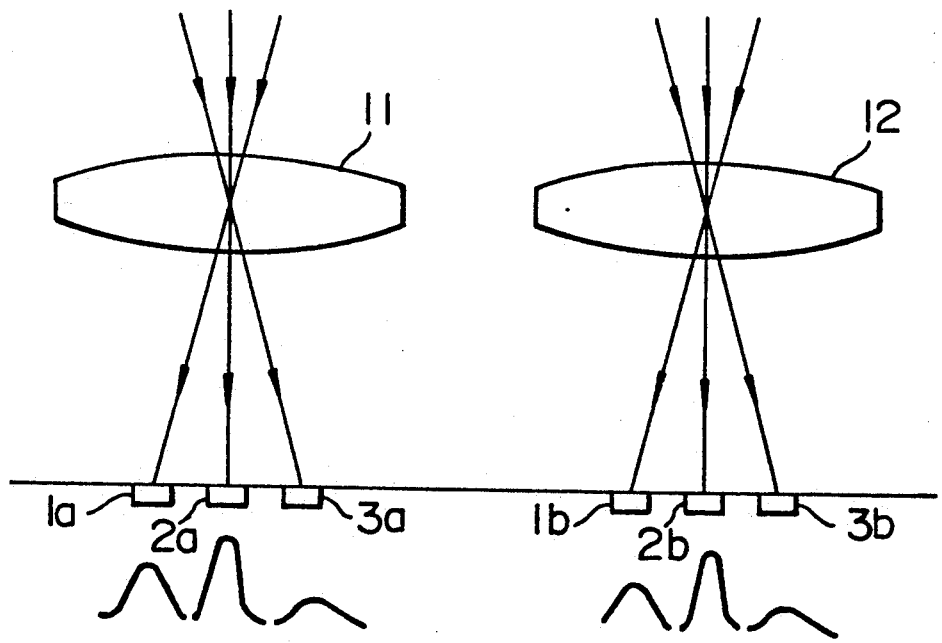
FIG. 2 is a diagram explaining an image focusing state by the autofocusing device shown in FIG. 1.

FIG. 2 illustrates incident light to photosensors via lenses, as seen from a cross sectional view taken along line II—II in FIG. 1. Light coming from a subject to the center of the lenses 11 and 12 goes straight and incident to the photodiodes 1 to 6. In FIG. 2, light incident to the photosensor 1a comes from the upper right in the drawing. Likewise, light incident to the paired photosensor 1b comes from the upper right.

If the pair of photosensors 1a and 1b is selected, an in-focus state of a subject at the upper right can therefore be checked. Similarly, if the pair of photosensors 3a and 3b is selected, an in-focus state of a subject at the upper left can be checked. If the pair of photosensors 2a and 2b is selected, an in-focus state of a subject at an upper middle can be checked.

In this manner, in-focus states of three points, e.g., center and right and left sides within a field of view, can be detected.

Six pairs of photosensors are provided in the autofocusing device shown in FIG. 1 in order to detect in-focus states of a plurality of points not only in the horizontal direction but also in the vertical direction within a field of view.

Figure 3:
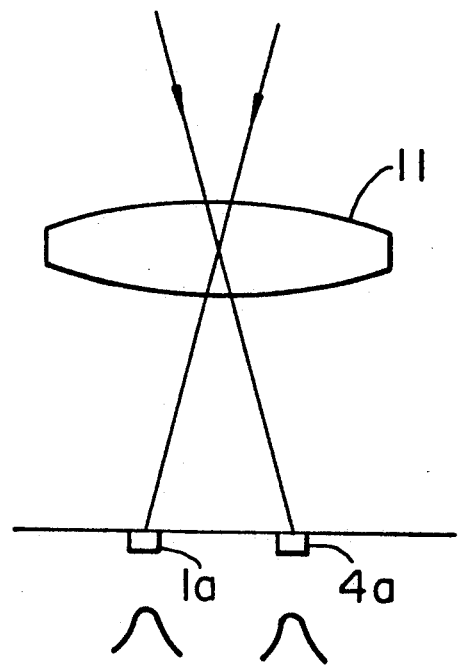
FIG. 3 is a diagram explaining another image focusing state by the autofocusing device shown in FIG. 1.

FIG. 3 illustrates light incident to photosensors via a lens in the vertical direction, as seen from a cross sectional view taken along line III—III in FIG. 1. Light incident to the photosensor 4a at the lower position of the semiconductor chip 10 comes from an upper area in the vertical direction within a field of view. Light incident to the photosensor 1a comes from a lower area within the field of view.

In this manner, in-focus states can be detected at a plurality of areas separated in the vertical direction within a field of view.

Figure 4:
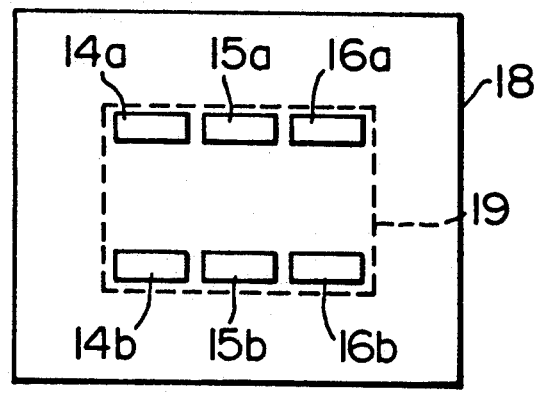
FIG. 4 is a plan view showing the outline of a layout within a finder.

If the sensor pairs disposed as shown in FIG. 1 are used, six target areas 11 to 16 as shown in FIG. 4 are displayed on a finder of a camera. Specifically, three target areas 14a, 15a and 16a are displayed on the upper area of a focus detecting area 19 within a field of view 18, and the other three target areas 14b, 15b and 16b are disposed on the lower area. A camera operator selects one of the six target areas 14a to 16b to focus a subject at the selected target area.

Figure 5:
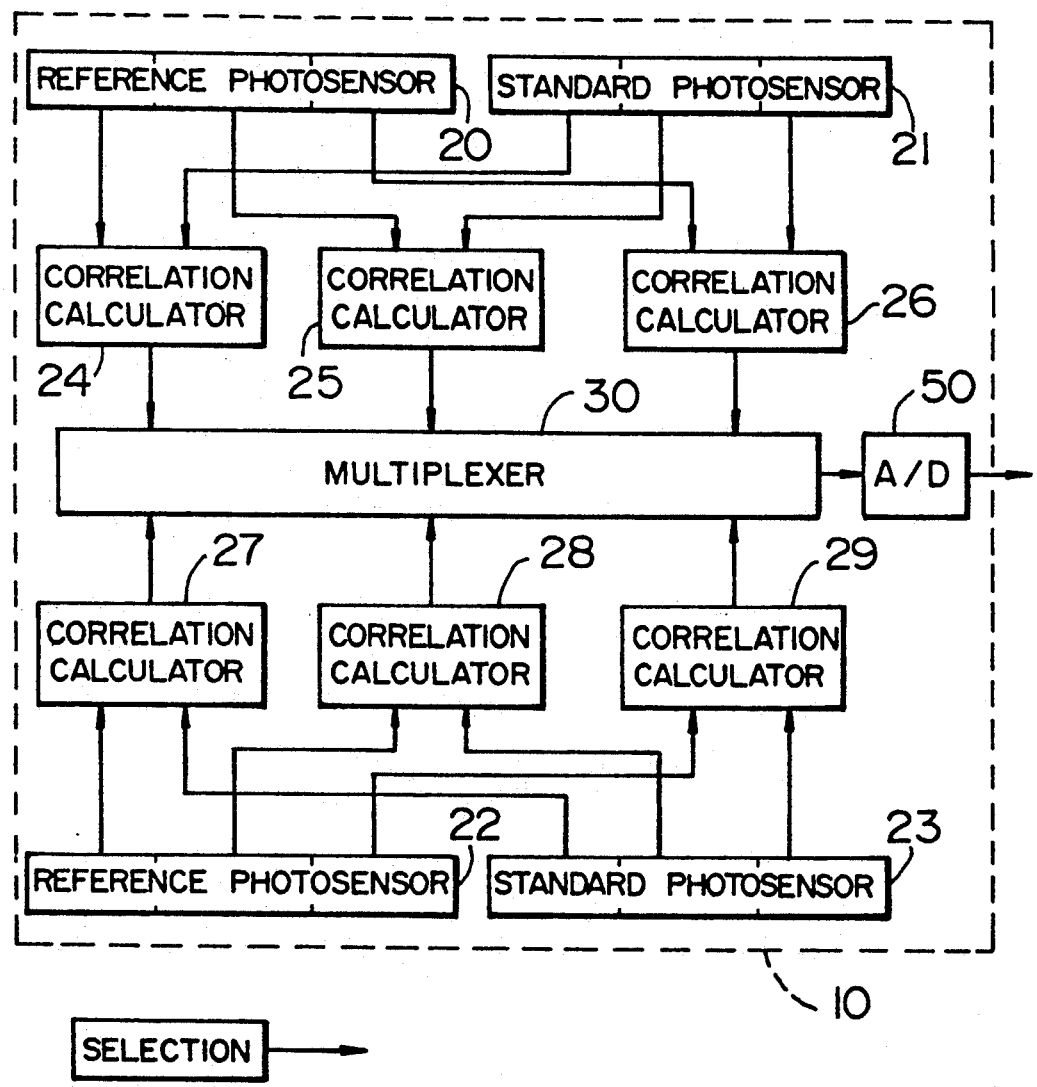
FIG. 5 is a schematic block diagram showing a layout of electrical circuits of the autofocusing device shown in FIG. 1.

FIG. 5 is a block diagram showing the layout of circuit elements of the autofocusing device shown in FIG. 1. A reference photosensor 20 corresponds to an assortment of three photosensors 1a, 2a and 3a at the upper left of FIG. 1 and their peripheral signal pickup circuits. Similarly, a standard photosensor 21 corresponds to an assortment of three photosensors 1b, 2b and 3b at the upper right of FIG. 1 and their peripheral signal pickup circuits. Likewise, a reference photosensor 22 corresponds to photosensors 4a, 5a and 6a at the lower area of FIG. 1, and a standard photosensor 23 corresponds to photosensors 4b, 5b and 6b at the lower area.

The reference photosensors 20 and 22 supply six detection signals, and the standard photosensors 21 and 23 supply six detection signals. Each of six pairs of detection signals is supplied to a corresponding one of six correlation calculators 24 to 29 which calculate correlation values and output signals representative of focus states of respective subjects.

These output signals are supplied to a multiplexer 30 which outputs the signal selected by a camera operator, the signal being used for focus adjustment of the camera. The signal outputted from the multiplexer 30 is converted into a digital signal by an analog-digital (A/D) converter 50.

The photosensors 20 to 23, correlation calculators 24 to 29, multiplexer 30, A/D converter and other peripheral circuits are integrated on a single semiconductor chip 10.

Figure 6A:
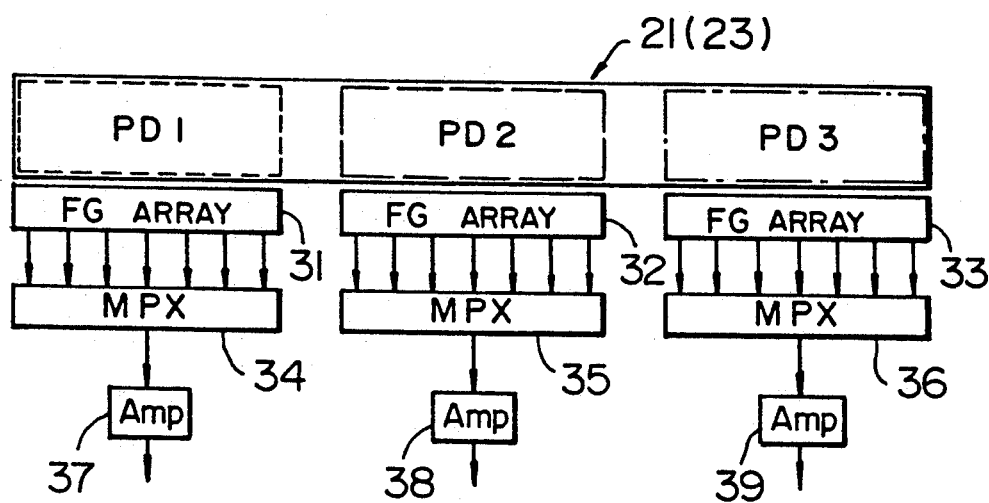
FIGS. 6A and 6B are enlarged block diagrams showing photosensors of the autofocusing device shown in FIG. 5.
Figure 6B:
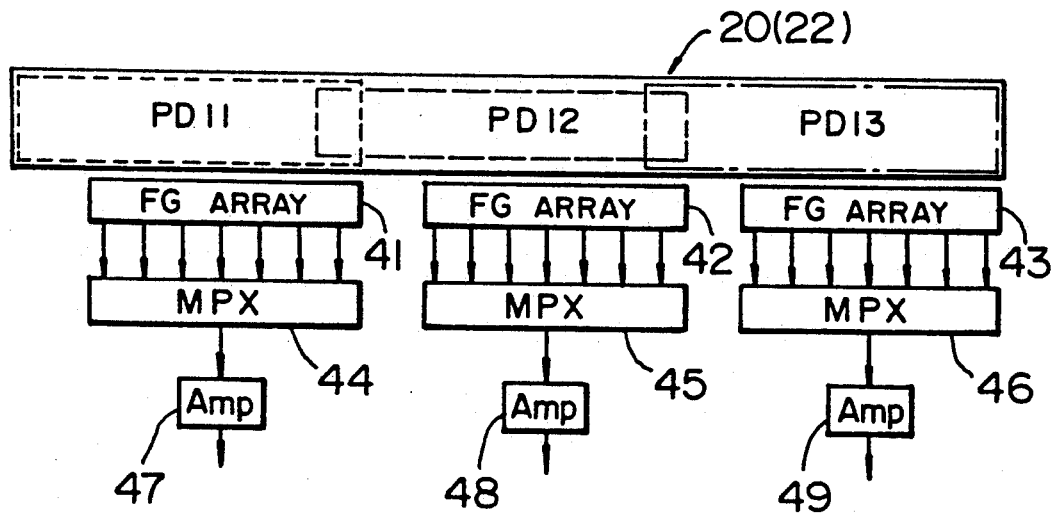
Figure 7A:
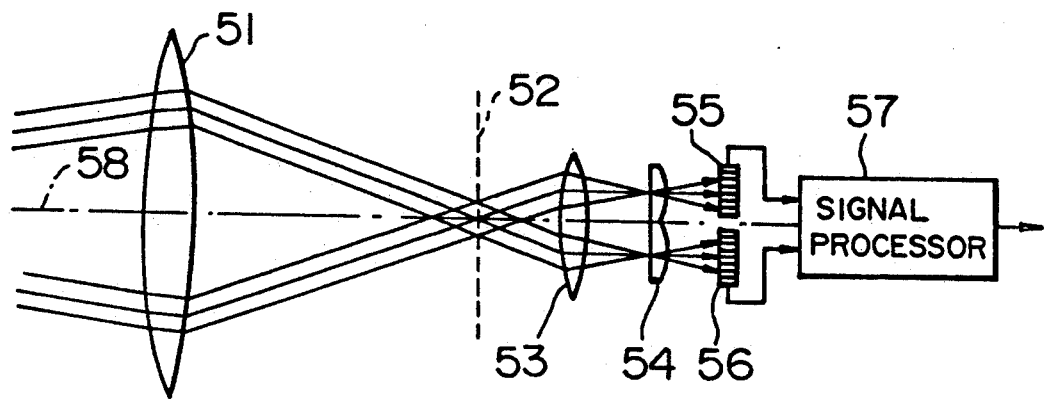
FIG. 7A is a block diagram showing the outline of a conventional autofocusing device.
Figure 7B:
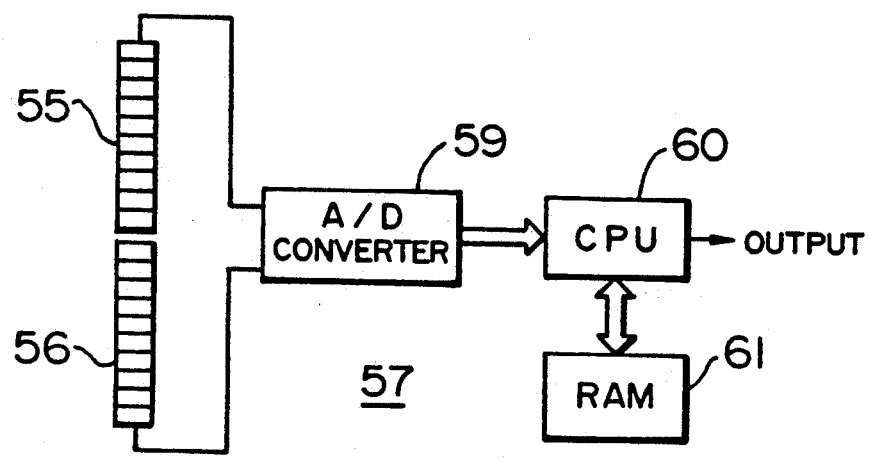
FIG. 7B is a block diagram of the signal processor shown in FIG. 7A.

FIG. 6A and 6B show the detailed structure of the photosensors 20, 21, 22 and 23. FIG. 6A shows the structure of the reference photosensors 21 and 23, and FIG. 6B shows the structure of the standard photosensors 20 and 22.

Referring to FIG. 6A showing the structure of the reference photosensor 21 (23), a series of photodiodes forms three photodiode groups PD1, PD2 and PD3. Electric charges generated in PD1 are converted to a voltage signal by a floating gate array 31, transformed into a serial signal by a multiplexer 34, and outputted from an amplifier 37.

Similarly, signals detected by the photodiode group PD2 are sent to a floating gate array 32, transformed into a serial signal, and outputted from an amplifier 38. Signals detected by the photodiode group PD3 are sent via a floating gate array 33 to a multiplexer 36, and the transformed serial signal is outputted from an amplifier 39. The reference photosensor 21 or 23 shown in FIG. 5 is structured as described above.

Referring to FIG. 6B showing the structure of the reference photosensor 20 (22) shown in FIG. 5, a series of photodiodes forms three photodiode groups PD11, PD12 and PD13, like the structure shown FIG. 6A. However, the number of photodiodes of the reference photosensor is larger than that of the standard photosensor. It is not necessary for three photodiode groups PD11, PD12 and PD13 to be formed separately, but they may have a shared portion at boarder areas. Images focused by the lens may overlap each other on the train of photodiodes of the three groups. Floating gate arrays 41, 42 and 43, multiplexers 44, 45 and 46, and amplifiers 47, 48 and 49 all have the same structure and function as those shown in, and described with, FIG. 6A.

As described above, according to this embodiment, although the signal processor becomes complicated because of an increased number of signals to be processed, the number of lenses does not increase allowing the optical system to have the same structure as that of a single autofocusing device. By setting a plurality of photosensor areas within an area covered by a lens, it becomes possible to detect focus states of a plurality of areas within a field of view.

The present invention has been described in connection with the preferred embodiments. The present invention is not intended to be limited only to the above-described embodiments. It is obvious that person skilled in this field of art can make various modifications, improvements, combinations and the like.

We claim:

1. A phase difference detecting type autofocusing device comprising:
    an optical system having first and second lenses, said first and second lenses having the same focal length and disposed on a first plane with the optical axes of said lenses being set in parallel;
    a plurality of first photosensors, having photosensitive regions and being disposed on a second plane in parallel with said first plane, for converting information of images focused by said first lens into electric signals; and
    a plurality of second photosensors, having photosensitive regions and being disposed on said second plane at positions covered by said second lens, for converting information of images focused by said second lens into electric signals, each of said second photosensors being spaced apart in the same direction by an equal distance from a corresponding one of said plurality of first photosensors,
    wherein said first and second photosensors are disposed two-dimensionally in a matrix shape and are formed on a single, rectangular semiconductor chip linearly along two opposite sides of said chip, and correlation calculation circuits and a multiplexer are formed on said chip at an area intermediate of said first and second photosensors, so that said photosensitive regions of said first photosensors are spaced apart by a substantial distance from said photosensitive regions of said second photosensors on said single, rectangular semiconductor chip.

2. A phase difference detecting type autofocusing device according to claim 1, wherein said plurality of first and second photosensors include trains of a number of photodiodes linearly disposed in a predetermined direction, and a plurality of electric charge detector groups connected to respective areas of said photodiode trains.

3. A phase difference detecting type autofocusing device according to claim 1, wherein said second sensor has said photodiodes more than that said first sensor has.

4. A phase difference detecting type autofocusing device according to claim 3, wherein said plurality of second photosensors are integrally formed in one photodiode train having a plurality of light receiving areas.

5. A phase difference detecting type autofocusing device according to claim 1, including a selector circuit for determining which pair of said first and second photosensors is used.

* * * * *